June 3, 1969  J. G. KIMBALL  3,447,334
ENVIRONMENTAL SYSTEM FOR PRESERVATION OF PERISHABLES
Filed Dec. 7, 1967  Sheet 1 of 2

INVENTOR.
JOHN G. KIMBALL
BY
*John N. Haywood*
ATTORNEY

United States Patent Office 3,447,334
Patented June 3, 1969

3,447,334
ENVIRONMENTAL SYSTEM FOR PRESERVATION OF PERISHABLES
John G. Kimball, Rolling Hills Estates, Calif., assignor to The Garrett Corporation, Los Angeles, Calif., a corporation of California
Filed Dec. 7, 1967, Ser. No. 688,830
Int. Cl. F25d *17/06;* F28d *3/00*
U.S. Cl. 62—64                                    16 Claims

ABSTRACT OF THE DISCLOSURE

A method and apparatus for the preservation of perishables wherein a refrigerant is passed through heat exchange means and expelled at high velocity through ejector means which serve in a first ejector pumping stage to draw in outside fluid, as necessary, and to recirculate the flow of the inside or ambient refrigerated environmental fluid by generating a secondary atmospheric flow which mixes with the ejected refrigerant. The gaseous mixture then moves via distribution means of a second ejector pumping stage to induce eddy flow of the refrigerating atmosphere as the mixture moves at medium velocity into heat exchange relationship with said heat exchange means, cooling and humidifying the perishables.

Summary

The invention pertains, in general, to a method and apparatus for the preservation of perishables which has particular applicability to the preservation of foodstuffs. Prior such methods have frequently employed mechanical apparatus, making use of Freon or carbon dioxide as a refrigerant, and accordingly have been subject to maintenance and temperature control problems. Where systems have provided refrigeration through use of gases in liquefied or solid state as refrigerants—as here—they have often been deficient as a result of the creation of adverse temperature gradients and unsatisfactory humidity conditions. The method of this invention, while affording the advantages of reduced maintenance and highly accurate temperature control, at the same time reduces to a substantial degree the temperature gradients found in other systems.

Certain of the elements of the system of this invention are employed in U.S. Patent 3,117,426 for Environmental System for Protective Suit, assigned to the same assignee. However, the patented system relies upon high pressure, low volume flow in a protective suit to control the environment of its user against noxious fumes and vapors of a hostile environment. In contrast, this invention employs high volume refrigerant gas flow with two stages of ejector pumping action to refrigerate and preserve perishables while at the same time affording control of refrigerant makeup and its humidification.

It is frequently necessary to provide an atmospheric environment for perishables which is controlled both as to constitutent and humidity content. This is particularly important where the perishables constitute fresh produce and preservation is to take place over a considerable period of time. Respiration of the produce then becomes a problem and assurance of adequate carbon dioxide or other atmospheric content is frequently essential. It is also desirable to maintain a high humidity environment to protect against produce wilting. If the foregoing can be accomplished with a minimum of handling of the produce or other perishables, considerable economies will result. This invention fulfills the foregoing objectives by providing a self-contained refrigeration system and a method of refrigeration which, except for periodic refrigerant supply, is independent of auxiliary supporting equipment, and capable of transport to and loading at convenient pick-up points with no further handling of refrigerated perishables until arrival at destination.

Another object of this invention is to provide a reliable system for the preservation of perishables requiring a particular environment which is capable of control within close temperature limits; is reliable and economical to operate and maintain; and which is adapted to containment in a readily transportable compact unit.

Other objects and advantages of this invention will become apparent from the description which follows.

Drawings

Description

Briefly, the invention comprises a unique method and apparatus for the control of the environment of perishables by employing gas in liquid or solid state as a refrigerant. Although a variety of gases may be employed, e.g., nitrogen, air, carbon dioxide, methane, ethane, etc., liquid nitrogen is particularly satisfactory both from an economic and operational standpoint and the description which follows will be directed, although not limited, to a system employing liquid nitrogen as a refrigerant. Heat exchange means provide for vaporization of the gas and for temperature and humidity control. If, however, the refrigerant is carbon dioxide in the solid or "Dry Ice" phase, the carbon dioxide is prior sublimated in conventional fashion to enter the heat exchanger in a vapor state. The liquid nitrogen, held in a suitable tank, may be self-pressurized by means of a pressure buildup coil to provide a circulation energy gradient to assure the flow of the nitrogen. The pressurized liquid nitrogen is fed through the heat exchange means where it is vaporized from whence it flows through an ejector nozzle where it is converted to a high velocity stream and thence into a duct or plenum.

The ejector nozzle serves as a pump, generating a suction and aspirating the atmosphere of the perishables into the duct for recirculation. The ejector pump maintains a positive pressure in the duct over the ambient pressure around the perishables. Orifices in the duct permit the secondary ejection of the mixed refrigerant and ambient atmosphere at medium velocity directly over the heat exchanger. These secondary streams of fluid emitting from the orifices act as low energy pumping jets and cause further mixing and circulation directly within the compartment volume occupied by the perishables. This considerable mixing is the physical phenomenon whereby the temperature gradients around the perishables are reduced to a negligible minimum. Substantially uniform temperatures are thus maintained about the perishables.

Figure 1:
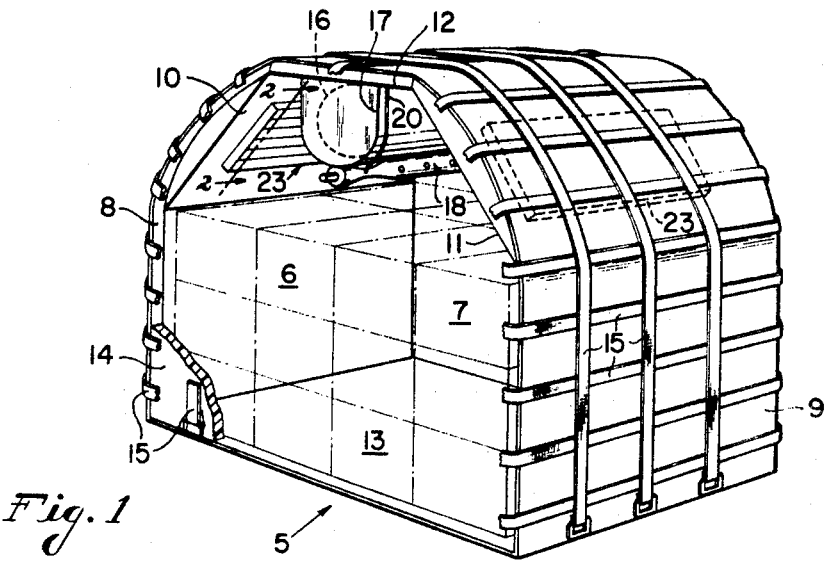
FIG. 1 is a perspective view of an air cargo container embodying the environmental system.
Figure 2:
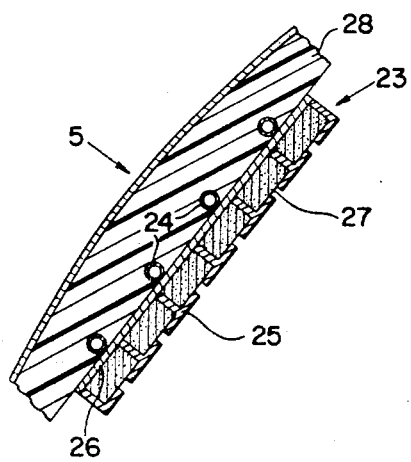
FIG. 2 is an enlarged sectional view taken on the line 2—2 of FIG. 1 showing the heat exchanger construction.

As shown in the embodiment of FIGURE 1, the environmental system is embodied in an insulated air-cargo container or igloo 5, for perishables 6, having a vertical back wall 7, vertical side walls 8 and 9, canted overhead panels 10 and 11, a ceiling panel 12 and a floor 13. Closure of the open front-end is by means of an insulated door member 14, which is secured by means of straps 15, which are secured at either end to the lower portion of the container and extend about its upper periphery.

Figure 4:
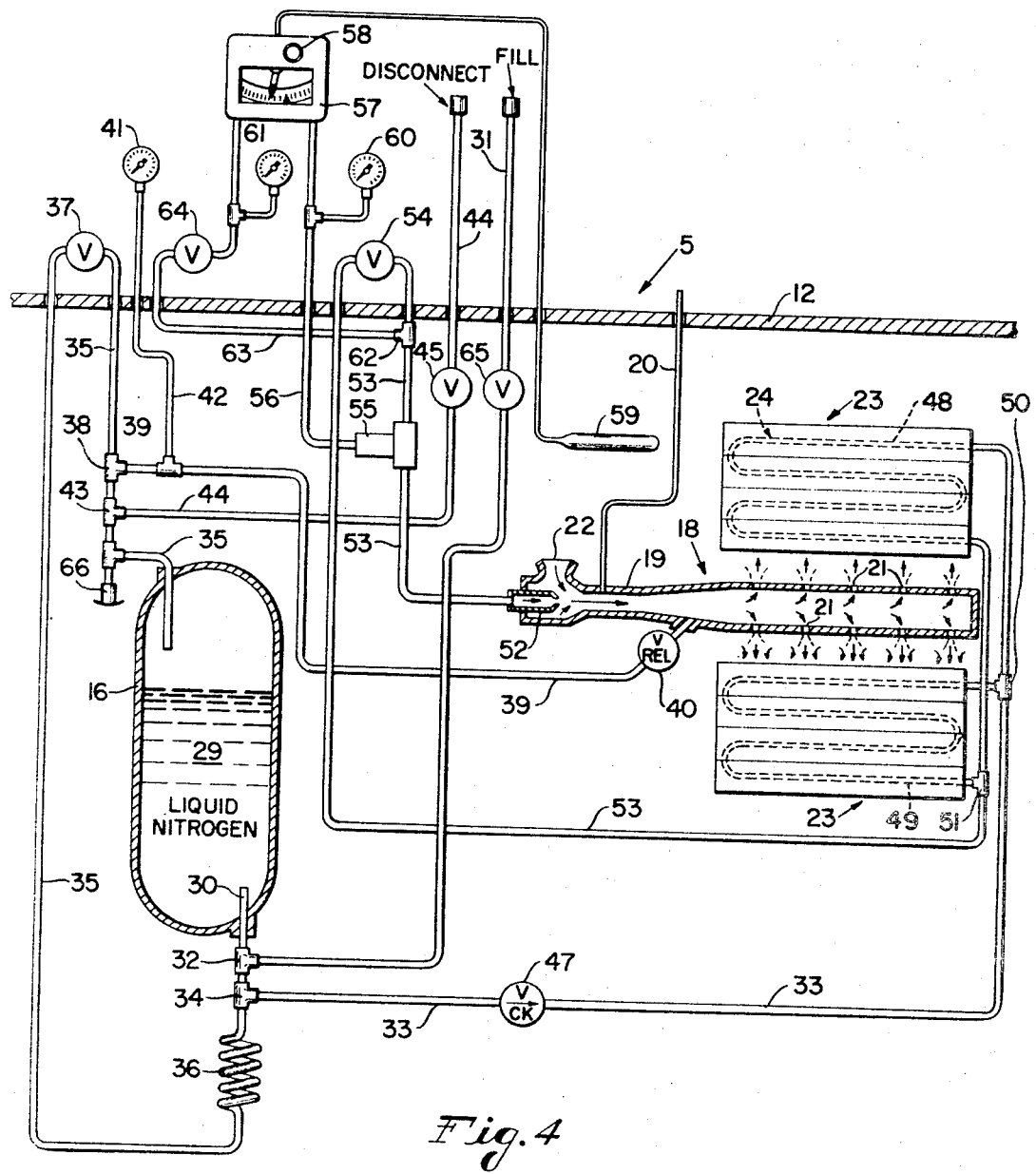
FIG. 4 is a schematic view of the environmental system employed in the air cargo container of FIG. 1.

Positioned immediately below and running longitudinally along ceiling panel 12 within the housing 17 is a liquid nitrogen storage container 16, indicated in dotted outline. Carried beneath the housing for distributing the nitrogen throughout the interior of the container 5 is an ejector mixing duct or plenum 18, which serves as a second stage ejector pump. As shown in FIG. 4, the reduction in cross-section at 19 increases the velocity of refrigerant gas flow therethrough and the suction or aspirating effect utilized in accomplishing secondary atmospheric flow and recirculation of the compartment ambient refrigerated environmental atmosphere.

A capillary or other tube 20 communicates at one end with the ejector nozzle throat or reduced portion 19 and at the other, as diagrammatically indicated in FIG. 4, with the atmosphere outside container 5, for reasons presently to be explained. As shown in FIG. 4, the mixing duct communicates with the container interior via a plurality of opposed ports or orifices 21 and a flared aperture 22, the latter located near the duct rearward end adjacent to throat section 19 for the purpose of inducing the above-indicated secondary flow.

Secured to the underside of the canted overhead panels 10 and 11 for compartment refrigeration and humidification, are a pair of heat exchangers 23, located opposite the ejector duct 18 and in the path of refrigerant flow from its refrigerant-expelling orifices 21. The heat exchangers 23 are each comprised of a plurality of tubing runs 24 and flanged fins respectively bonded or otherwise secured to opposite sides of a sheet 26 comprised of highly heat conductive material, such as aluminum. Wicking of sponge or similar moisture absorbent material 27, which provides capillarity important to eliminating the adverse effects of liquid surface tension, is positioned between the fins to serve in compartment humidification control. Polyurethane foam or other suitable insulation 28 is provided in the walls, floor, ceiling, and door of the container to minimize heat transfer from the container to atmosphere and structure outside the container.

Referring to FIG. 4, there is diagrammatically shown tank 16 for the storage of liquid nitrogen 29. Extending from the lower end of the tank is a supply conduit 30 which communicates with a fill conduit 31 and fill valve 65 through a T 32 and with a supply conduit 33 through a T 34. Conduit 33 supplies heat exchangers 23 with nitrogen.

A system pressurizing conduit 35 is in closed-loop communication with the upper end of tank 16 through pressure buildup coil 36, which latter is positioned to absorb heat from the interior of the container 5. Heat absorbed by the liquid nitrogen in the pressure buildup coil 36 causes an increase in the pressure in tank 16, thus providing the necessary supply pressure gradient. Valve 37 initiates and shuts off flow through conduit 35 and the latter communicates with duct 18 via T 38 and conduit 39 for purposes of pressure relief, with valve 40 controlling such relief flow. The gauge 41 connected to conduit 39 by conduit 42 serves to indicate system pressure. Also communicating with the conduit 35 via T 43 is a disconnect conduit 44 which permits withdrawal of nitrogen from tank 16 via control valve 45.

Direction of flow of liquid nitrogen through supply conduit 33 is controlled by check-valve 47 with the conduit supplying heat exchanger coils 48 and 49, connected in parallel, through T 50. T 51 joins the outlet portions of these conduits to supply ejector nozzle 52 of the first stage ejector pump through the conduit 53 via shutoff valve 54 and controller valve 55. The latter valve is connected through conduit 56 with temperature control means 57, manually indexed to the temperature desired through operation of knob 58. Temperature sensing device 59 senses the temperature in accordance with the difference between the indexed and sensed temperatures. A pressure gauge 61 is connected to conduit 53 via valve 64, conduit 63 and T 62, and indicates the regulated pressure in the conduit 53. The control pressure in conduit 53 for valve 55 is measured by means of a gauge 60.

Before describing system operation, it should initially be noted that the system is completely self-contained, requiring no external power supply. Further, it can be preset to maintain within close limits, a desired refrigeration temperature within the container.

In utilizing a continuous medium velocity circulation induced through two stages of ejector pumping, with mixture of vaporized nitrogen and the secondary flow of container atmosphere, the system of this invention differs from the usual liquid nitrogen system in which the liquid nitrogen is sprayed directly into the container. With such direct spray there is created the possibility of damage to perishables resulting from the extreme temperature gradients created. This invention substantially eliminates such gradients.

Turning now to system operation, tank 16 is initially filled with liquid nitrogen 29 which may be supplied from a convenient source, such as a portable ground cart (not shown) connected to fill conduit 31, Valve 65 is opened to admit the liquid nitrogen into the conduit for flow via T 32 into conduit 30 and thence into the tank 16. At the same time valve 45 is opened to permit venting of overflow by way of nitrogen gas boil-off to atmosphere through conduits 35 and 44, as the tank is filled to the desired level. Although not shown, a pressure gauge of conventional design may be provided if desired to indicate the fill level of liquid nitrogen in tank 16. When the tank is thus filled, valves 45 and 65 are closed; the ground cart disconnected; and valve 37 opened to initiate pressurization of tank 16, the latter accomplished by directing the liquid nitrogen through pressure buildup coil 36 positioned in heat exchange relationship with atmosphere in container 5 to transfer heat absorbed by the coil, vaporizing a portion of the liquid nitrogen.

Valve 37 is a shutoff for the flow of nitrogen through conduit 35. When valve 37 is open, the self-pressurizing gas in the tank can be relieved through conduit 39 and relief valve 40 which is set at a desired relief pressure. When such set relief pressure is exceeded, as may result from leakage of heat into tank 16, valve 40 relieves nitrogen flow through conduit 39 into mixing duct 18 where it dissipates but delivers its refrigeration inside the container 5. Check valve 47 performs an equalizer function accommodating the liquid head in tank 16 and permitting flow of nitrogen in conduit 33 only in a direction away from tank 16, i.e., from T 34 to T 50. If the pressure should build up beyond predetermined limits, relief to the ejector duct 18 is provided through conduit 39 and valve 40, this arrangement permitting use of the relief flow for refrigeration. Safety pressure relief is provided via a safety burst disc 66.

The perishables 6 are precooled approximately to the temperature at which they are to be maintained in container 5 by a refrigeration system (not shown) before being loaded into the container in the positions shown in broken-line outline in FIG. 1. Where the perishables constitute fresh produce, the temperature within container 5 may be maintained at 55° F., plus or minus 5°. With the tank 16 suitably pressurized, operation of the system begins with opening of the main flow control valve 54 which allows nitrogen to be delivered to the controller valve 55, manually set to the desired operating temperature through knob 58. The latter valve operates responsive to the action of temperature sensing device 59. A valve (not shown) contained in the controller 57 controls the regulated pressure in conduit 56 and appropriately modulates controller valve 55 to regulate the flow of gaseous nitrogen flowing from the heat exchangers 23 through conduit 53 for emission from ejector nozzle 52 in a first stage of ejector pumping action. The vaporized liquid nitrogen passes via valve 54 and valve 55 through ejector nozzle 52 for expulsion therefrom at high velocity.

The vaporized liquid nitrogen is the primary flow in the ejector duct 19 and mixes in this first ejector pumping stage with atmosphere from the container 5, the latter circulated by way of secondary flow aspirated through flared aperture 22. The resultant large mass of primary and secondary gas flows through a second ejector pumping stage at medium velocity from ports 21 which are so located and directed as to guide the refrigerant gas and secondary flow mixture in eddying flow over the heat exchangers 23. The mixture is then caused, by its inertia and the pressure gradients generated by aspiration, to circulate throughout the interior if the container to cool the perishables 6 without creating substantial temperature differentials.

From the above, it is seen that the primary flow comprises the liquid nitrogen which has been vaporized in heat exchanger coils 48 and 49 to flow at high velocity from ejector nozzle 52. A mass ratio of injected nitrogen gas to aspirated secondary atmosphere in the vicinity of 10 to 1 or greater may be achieved utilizing practicable tank nitrogen pressures, e.g., 75 p.s.i.g. with the container at approximately 50 to 150 p.s.i.g. The ejector duct design materially increases the mass of gas flow within the compartment by adding a second pumping stage. The duct orifices 21 are so located as to define secondary jet flow of sufficient velocity to induce eddy flow within compartment 5. An absolute pressure within the duct of a few inches of water over the ambient pressure in the compartment 5 will induce an eddy flow on the order of five times the mass of the gas mixture expelled from apertures 21. The primary flow of gas from nozzle 52 therefore results in movement of a mass of circulating gas in compartment 5 approximately 50 times the mass of nozzle flow.

The capillary tube 20 performs a particularly important function where perishables requiring a minimum amount of oxygen are undergoing refrigeration. This tube in communication with atmosphere external to the container 5, serves to admit oxygen in the ambient air which is aspirated by the primary flow of refrigerant from nozzle 52. Typically, the resulting atmosphere throughout compartment 5 should contain no less than 1% oxygen if the perishables 6 are fresh produce. Although capillary tube 20 is illustrated in communication with ambient air, the tube may serve to admit other fluid for aspiration and distribution in compartment 5, as desired. If desired, the refrigerant liquid nitrogen may be mixed with oxygen to meet such oxygen requirement or may be utilized as a supplement thereto.

It is also important in the shipping of fresh produce that adequate atmospheric humidity be maintained in compartment 5. Where the compartment is to be maintained warmer than the freezing temperature of water, the heat exchangers 23 not only serve to vaporize the liquid nitrogen and cool the compartment but also provide such humidity control through the action of moisture holding material or wicking 27. At the outset the wicking material can be loaded with water or the moisture initially contained in the compartment prior to cooling may be relied upon, at least in part, to deposit itself by capillary action in the wicking as the mixture of the primary and secondary gas flows over the heat exchangers 23. This deposited moisture will freeze where the nitrogen gas is below a freezing temperature, with ice building up upon the heat exchangers until an equilibrium condition is reached, whereat the ambient compartment atmosphere is cooled by the ice and the nitrogen gas is heated by same. Humidification is thus permitted at temperatures close to freezing, with heating of the nitrogen avoiding further freezeout of moisture. Where the compartment is to be maintained below freezing temperatures, for example 20 to 25 degrees Fahrenheit, as in the case of the refrigeration of meats, it is similarly desirable to maintain such high compartment humidity. In this instance, the heat exchangers 23 will perform a humidity control function until such time as total freezing takes place on the surface of the heat exchangers.

Figure 3:
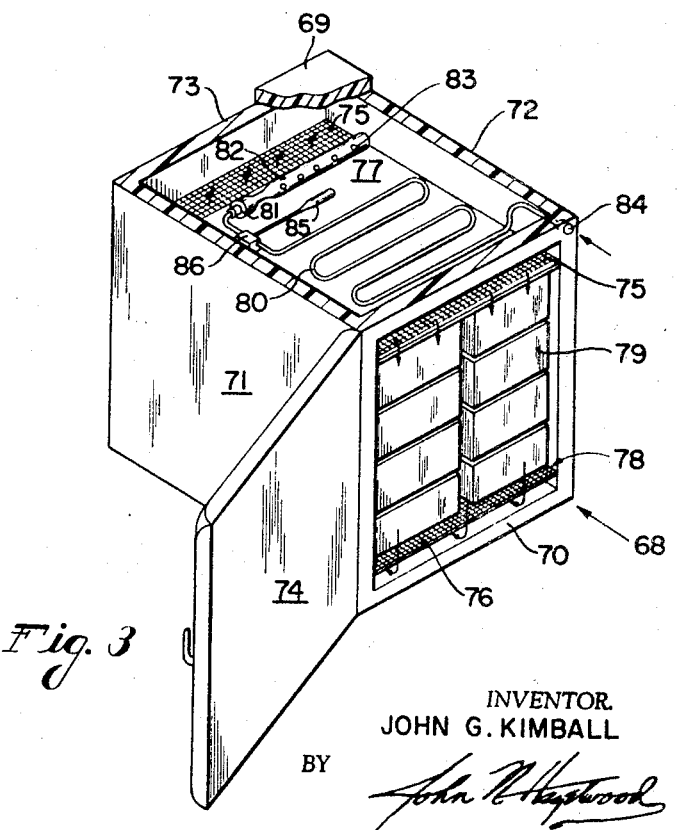
FIG. 3 is an airborne galley embodying the environmental system.

In FIG. 3 is shown another invention embodiment employing an ejector nozzle and duct similar to those heretofore described. This embodiment is particularly well adapted for installation in aircraft galleys or other applications where an economic, reliable system of minimum weight and volume is essential. The compartment 68 is comprised of top and bottom panels 69 and 70, exterior side walls 71 and 72, a back wall 73, and a hinged door 74. To permit recirculation of compartment refrigerant atmosphere there is provided a circulation path, as indicated by the arrows, with perforate panels 75 and 76 respectively provided in top and bottom inner members 77 and 78, the latter members being positioned in spaced relationship with the top and bottom panels of the compartment to define the upper and lower limits of the food storage volume. Removably positioned within this volume are a plurality of containers 79 in which perishables (not shown) are placed for preservation. Disposed between the member 77 and the top panel 69 is a heat exchanger 80, comprised of a plurality of transversely extending conduit runs. The heat exchanger is connected at one end to a source of liquid nitrogen (not shown) and at the other to an ejector nozzle 81 of a first ejector pumping stage. The nozzle supplies the duct or plenum 82, which is closed at one end and open at the other end adjacent ejector nozzle 81, for admission of secondary atmosphere recirculating from a first pass over the heat exchanger 80, and sucked into plenum 82 by reason of the aspiration effect of the primary nitrogen flow from nozzle 81. A plurality of ports or orifices 83 are provided in the duct 82 to direct, in a second ejector pumping stage, the primary-secondary mixture over the heat exchanger 80.

The ejector nozzle 81, duct 82 and heat exchanger 80 perform in a manner similar to that of the ejector nozzle, duct, and heat exchanger of the embodiment of FIG. 1, with similar first and second stage pumping action and circulation-inducing eddy flow. The liquid nitrogen is supplied to the heat exchanger 80 at 84, for flow as indicated by the arrow, to vaporize in the course of passage through the exchanger and to eject at high velocity from nozzle 81. In so doing, the ejecting nitrogen gas draws into duct 82 ambient refrigerated environmental atmosphere recirculating from passage through the compartment 68 via a circuit through perforate panels 75 and 76, as indicated by the arrows. The resulting high mass, medium velocity mixture is distributed through duct orifices 83 for passage in eddy flow over and cooling by the heat exchanger 80 to assure a substantially uniform refrigerant temperature throughout the perimeter of the compartment within which the containers 79 are positioned. A temperature sensing device 85 acting upon control valve means 86 provides flow control responsive to the temperature of the circulating atmosphere.

Although preferred embodiments of the invention have been described hereinabove, it will be appreciated that these embodiments may be altered, changed or modified without departing from the scope of the invention as herein claimed.

What is claimed is:
1. A method of preserving perishables comprising:
the steps of passing a refrigerant through heat exchange means to provide a cooled heat transfer surface;
in a first ejector stage, pumping the refrigerant from nozzle means to aspirate refrigerated environmental fluid ambient to the perishables for mixture with said pumped refrigerant;
in a second ejector stage employing the said mixture as a primary stream to induce eddy flow of fluid ambient to said perishables for over all mixing with said flow-inducing mixture; and,
passage of the overall mixture over said heat exchange means for cooling and circulation about the perishables.

2. The method of claim 1, wherein:
the said overall mixture is humidified by its passage over the heat exchange means.

3. The method of claim 1, wherein:
the refrigerant is vaporized by passage through said heat exchange means.

4. The method of claim 3, wherein:
the refrigerant is liquid nitrogen.

5. A method of preserving perishables comprising:
the steps of passing a refrigerant through heat exchange means to provide a cooled heat transfer surface;
in a first ejector stage, pumping the refrigerant from nozzle means to aspirate and mix with a refrigerated environmental first fluid ambient to the perishables, and a second fluid external of said environment to provide a total mixture of predetermined makeup;
in a second ejector stage, employing the said total mixture as a primary stream to induce circulation of fluid ambient to said perishables for overall mixing with said flow-inducing mixture; and
passage of the overall mixture over said heat exchange means for cooling and circulation about the perishables.

6. The method of claim 5, wherein:
the said total mixture is humidified by its passage over the heat exchange means.

7. The method of claim 5, wherein:
the refrigerant is vaporized by passage through said heat exchange means.

8. The method of claim 7 wherein:
the refrigerant is liquid nitrogen.

9. In a system for the preservation of perishables, the combination comprising:
a compartment for receipt of the perishables;
heat exchange means disposed in heat transfer relationship with said compartment for passage of refrigerant therethrough;
first stage ejector pump means in communication with said heat exchange means for receipt and discharge of refrigerant;
second stage ejector pump means in communication with said first stage ejector pump means for receiving refrigerant discharged by said first stage ejector pump means; and,
said first stage ejector pump means communicating with said compartment to aspirate refrigerated environmental fluid ambient to the perishables when discharging the refrigerant received from the heat exchange means into said second stage ejector pump means, and said second stage ejector pump means discharging over said heat exchange means the resulting mixture of refrigerant and aspirated environmental fluid to induce eddy flow and mixture with fluid ambient to the perishables.

10. The combination of claim 9, wherein:
the first stage ejector pump means communicates with a source of fluid external to the fluid ambient to the perishables; and
in said discharge of refrigerant aspirates said fluid for mixture with the refrigerant and the aspirated environmental fluid ambient to the perishables.

11. The combination of claim 9, wherein:
the first stage ejector pump means include a nozzle positioned to effect said discharge adjacent a flared conduit portion in said communication with the compartment; and,
said communication between the first and second stage ejector pump means is through a throat of reduced cross section.

12. The combination of claim 11, wherein:
said aspiration of fluid external to the fluid ambient to the perishables is through a conduit communicating with said throat.

13. The combination of claim 9, wherein:
said discharge by the second stage ejector pump means is from a duct which latter in receiving the discharge from the first stage ejector pump means develops a positive pressure for pumping action in said inducement of eddy flow.

14. The combination of claim 13, wherein:
said duct is closed at one end and open at the other for said communication with said first stage ejector pump means; and
is provided with apertures over at least a portion of its length for said inducement of eddy flow and direction of second stage ejector pump discharge over said heat exchange means.

15. The combination of claim 9, wherein:
said container is provided with members to define a path about at least a portion of the periphery of perishables within the container, for circulation of fluid ambient to the perishables from the said second stage ejector pump means discharge to the first stage ejector pump means for said aspiration.

16. The combination of claim 9, wherein:
the heat exchange means is provided with capillary moisture absorbent material for humidification of the said discharge from said second stage ejector pump means.

References Cited

UNITED STATES PATENTS

| | | | |
|---|---|---|---|
| 2,247,850 | 1/1941 | Rayburn | 62—121 |
| 2,943,459 | 7/1960 | Rind | 62—97 |
| 2,951,351 | 9/1960 | Snelling | 62—373 |
| 3,166,913 | 1/1965 | Carter | 62—223 |
| 3,281,075 | 10/1966 | Smyers | 62—64 |

WILLIAM J. WYE, *Primary Examiner.*

U.S. Cl. X.R.

62—89, 97, 121, 171, 373